May 27, 1941.  E. C. RANEY  2,243,166
CONTROL APPARATUS
Filed May 19, 1937   4 Sheets-Sheet 1
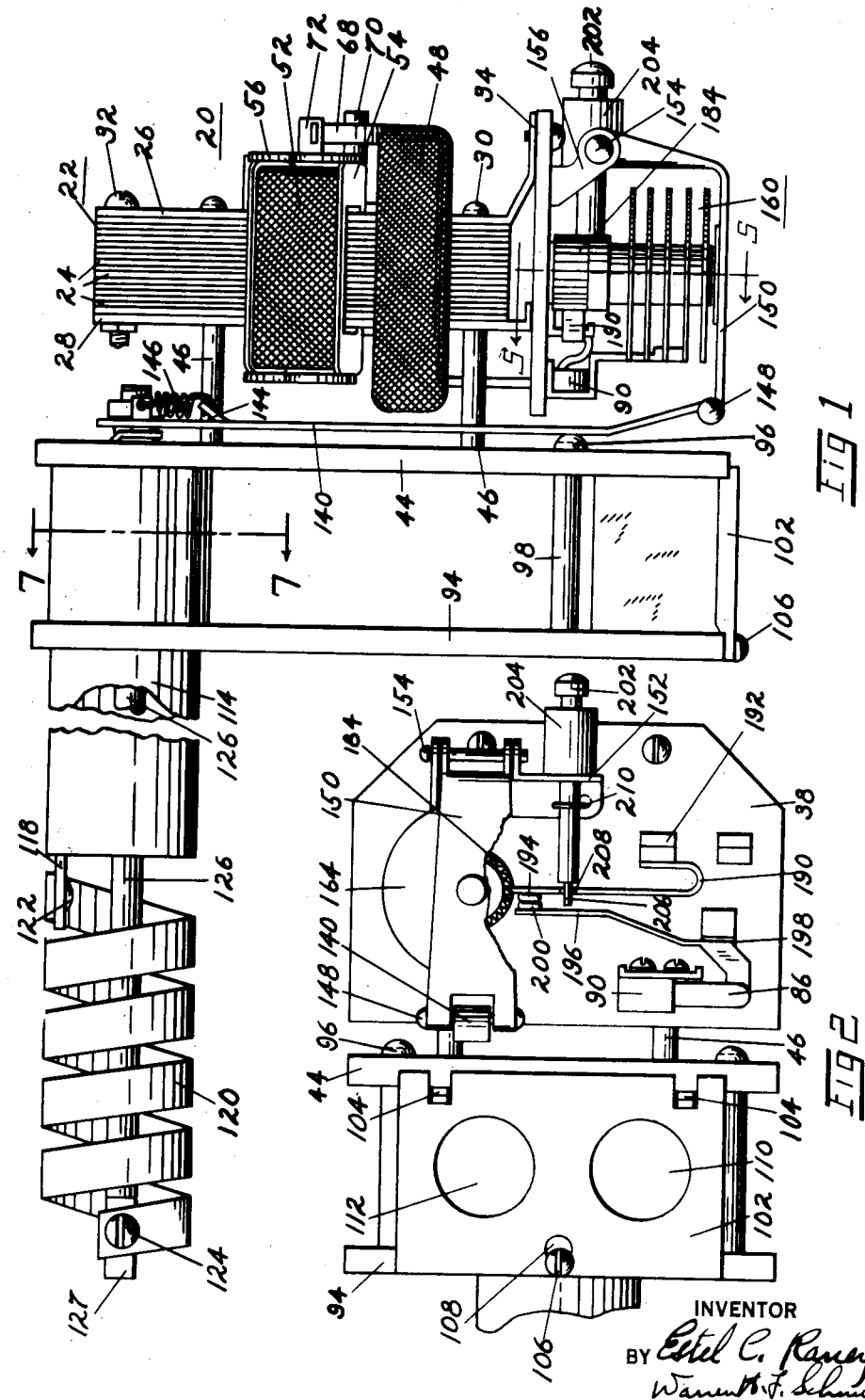
INVENTOR
BY Estel C. Raney
Warren F. Schneider
ATTORNEY May 27, 1941.  E. C. RANEY  2,243,166
CONTROL APPARATUS
Filed May 19, 1937  4 Sheets-Sheet 2
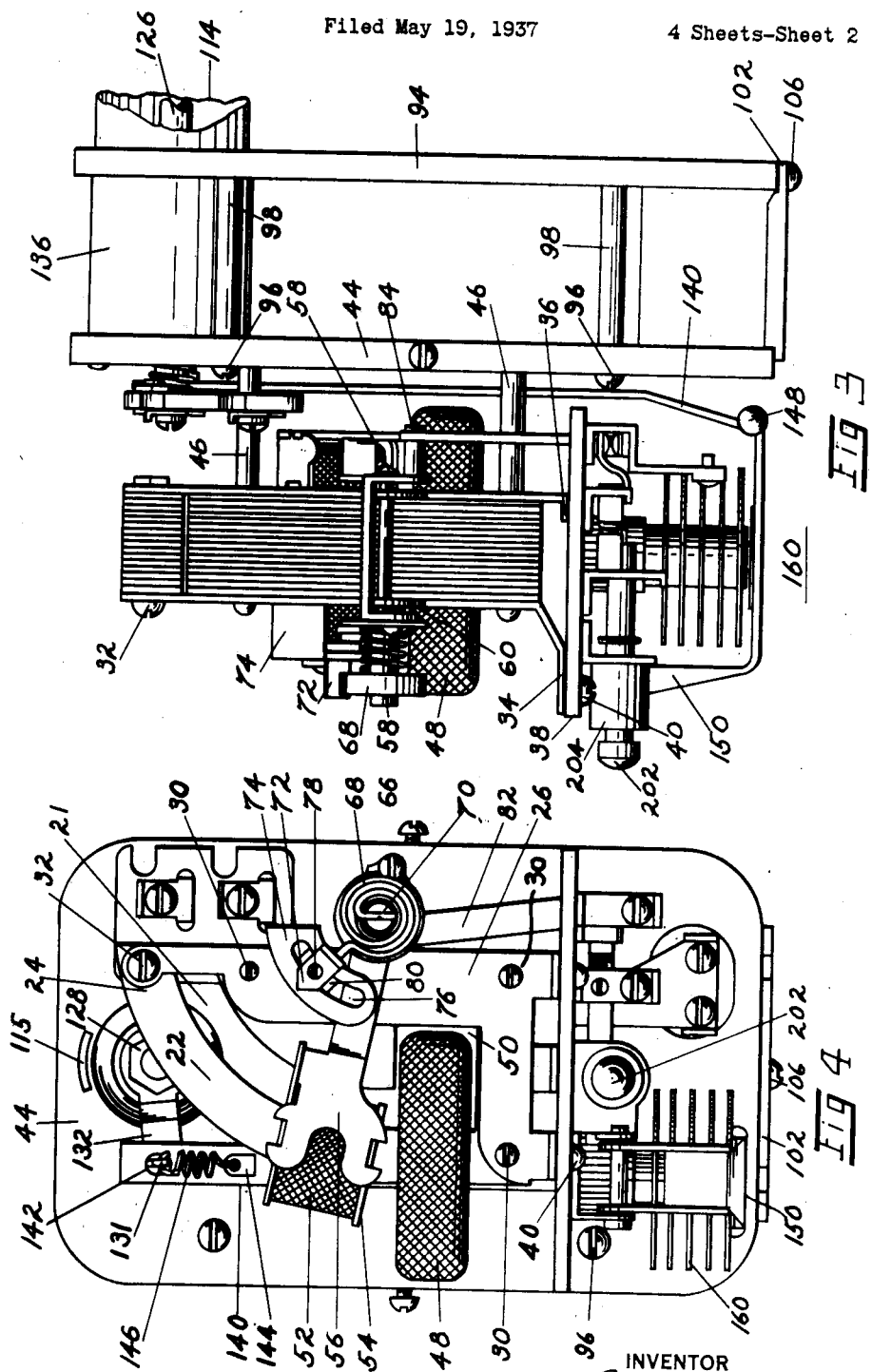
INVENTOR
Estel C. Raney
BY
Warren H. F. Schneider
ATTORNEY

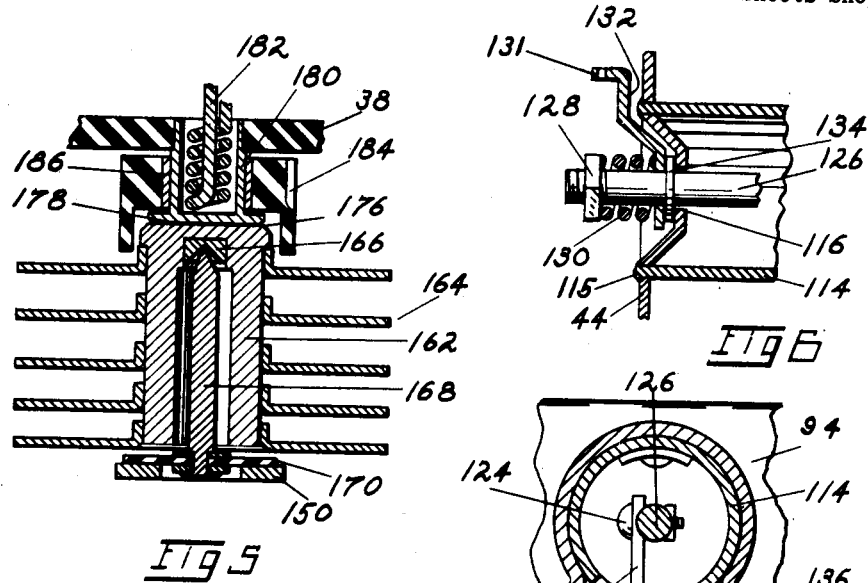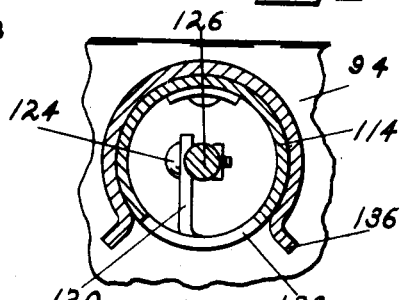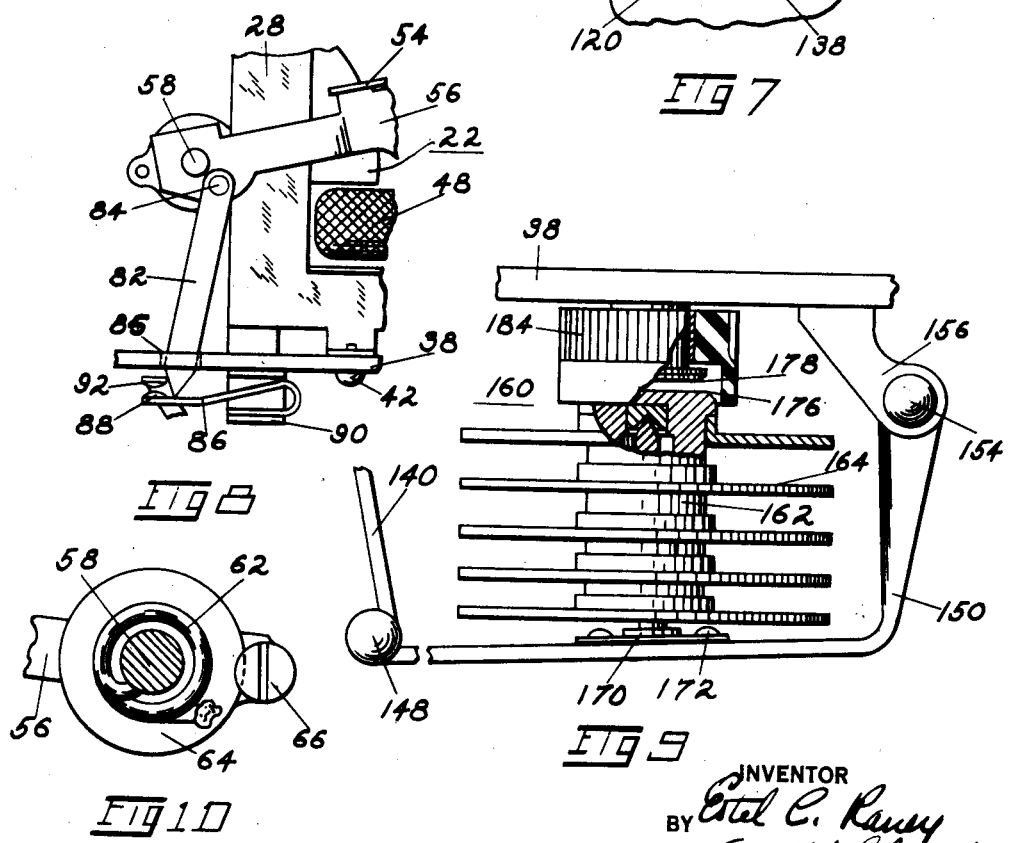

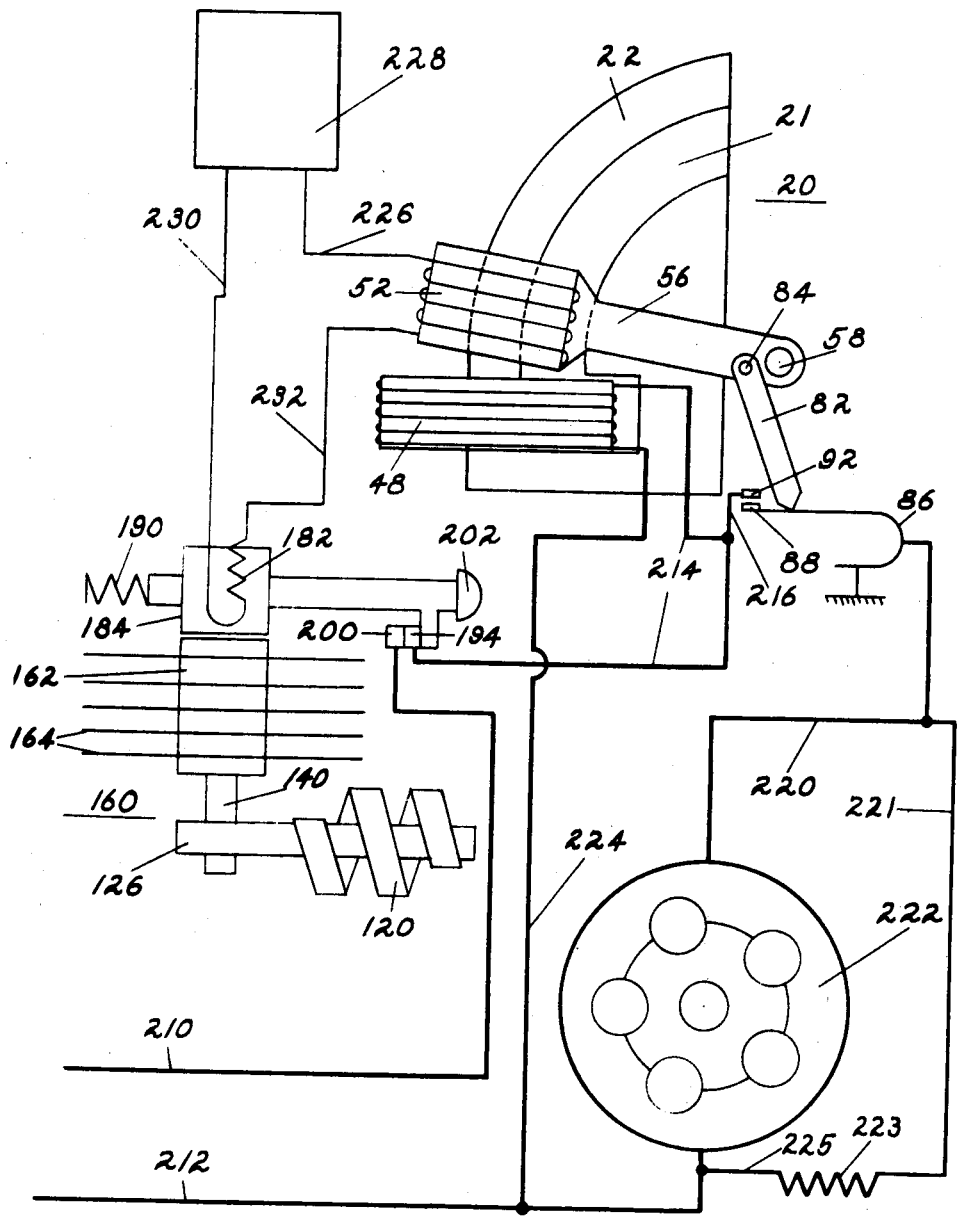

Patented May 27, 1941

2,243,166

UNITED STATES PATENT OFFICE 2,243,166

CONTROL APPARATUS

Estel C. Raney, Columbus, Ohio, assignor to Ranco Incorporated, Columbus, Ohio, a corporation of Ohio Application May 19, 1937, Serial No. 143,558

5 Claims. (Cl. 175—320)

My present invention relates to control systems and apparatus for use in such systems, and more particularly electrical control systems and apparatus for controlling fuel burning devices.

One of the objects of my present invention is to provide a control system which includes an electrically operated safety mechanism which is energized continuously during the operating period of the fuel burning device and which is capable of rendering the system inoperative in the event of failure of combustion, the control system also including a device, which is responsive to combustion conditions, for preventing the operation of the safety mechanism and thereby prevent stopping of the fuel burning device, when the fuel burning device operates in a normal manner.

In carrying out the above object, it is a further object of my invention to provide the system with a heat dissipator which is associated with the thermally operated safety mechanism, upon the establishment of combustion, for modifying the temperature thereof to below the operating temperature of the mechanism, thus preventing operation of the safety mechanism during normal operating periods of the fuel burner.

A further object of my invention is to provide the system with a current compensator for varying the energizing current for the said thermally operated safety mechanism inversely with respect to variation of the ambient temperature, thus causing the mechanism to always operate within a definite time period regardless of changes in ambient temperature.

It is a still further object of my invention to provide a constant current transformer for the system, wherein compensating devices are provided, for varying the current output therefrom to any desired value, and for varying the current output with respect to the ambient temperature.

Another object of my invention is to provide a thermally operated circuit breaker that is constantly heated during the operating periods of the device to be controlled and which includes a heat dissipator that is associated with the circuit breaker during normal operating periods of the device for modifying the temperature of the circuit breaker and thereby preventing the same from operating, the heat dissipator being operable to be moved out of engagement with the circuit breaker and allowing the same to operate in the event that the operation of the device, to be controlled, is abnormal.

Other and further objects and advantages will be apparent from the following description, reference being had to the accompanying drawings within a preferred form of embodiment of the present invention is clearly shown.

In the drawings:

Fig. 1 is a side elevational view of the assembled control apparatus;

Fig. 2 is a view of the underside of the apparatus;

Fig. 3 is a side elevational view of the apparatus taken on the opposite side to that shown in Fig. 1;

Fig. 4 is a front elevational view of the apparatus;

Fig. 5 is a sectional view on an enlarged scale of the heat dissipator or radiator in contacting position, the section being taken on line 5—5 of Fig. 1;

Fig. 6 is a sectional view on an enlarged scale of the spring clutch arrangement used to provide a slip connection between the bimetallic element and the actuating member of the combustion control;

Fig. 7 is a sectional view on an enlarged scale taken on line 7—7 of Fig. 1;

Fig. 8 is a fragmentary view of the transformer showing the mechanism utilized to operate the motor switch;

Fig. 9 is partial sectional view on an enlarged scale of the heat dissipator in the non-contacting position;

Fig. 10 is an enlarged view of the counterbalance spring and adjustment therefor, as used with the floating secondary of the transformer, and, Fig. 11 is a schematic wiring diagram showing the electrical connections used in the control system.

The construction of the apparatus may be best understood by referring to the drawings, wherein an assembled unit is shown in Fig. 1. A constant current transformer, generally indicated at 20, includes a core 22 having an arcuate section. The core 22 includes an internal slot 21 of arcuate shape. The core 22 is preferably laminated, and is made of any suitable number of plates 24. The plates 24 are clamped between two side or end plates 26 and 28 by screws 30 and 32. The end plates 26 and 28 are provided with extending portions or legs 34 and 36 respectively, and are bent outwardly and at right angles to the surface of the plates. The legs 34 and 36 are used as mounting brackets for attaching the plates 26 and 28 and the appended core 22 to a dielectric plate 38, which may be termed the base plate. The base 38 is attached to the plates 26 and 28 by screws 40 and 42.

A primary winding 48 is wound around the lower portion of core 22 and it will be noted that the core is cut away as at 50 to allow the primary core 48 to extend inwardly without contacting the opposite side of the core. A secondary coil 52, or as it may be termed, a movable armature, is wound on a spool 54. The spool 54 is disposed around that section of the core which is formed by the arcuate shaped slot 21. The bore of the spool 54 is sufficiently large to allow the spool to slide easily over the arcuate core section without engaging the core. The spool 54 and secondary coil 52 are supported by a U shaped lever 56 which is fastened to the spool 54 as by clinching. The mounting lever 56 is pivotally carried by a rod 58, which rod is journalled in two outwardly extending ears 60, formed integrally with the end plates 26 and 28. Thus the secondary coil is pivotally mounted and is free to move when energized, in an arcuate path over the core 22, the bearing point for the rod 58 being at the center of a circle of which the curved outer portion of the core 22 is a quadrant.

Considerable work is required to rotate the secondary coil 52 about its bearing on rod 58. To counterbalance for the weight of the coil and thereby diminish the work to move the same, a spring 62 (see Fig. 10) is fastened to the shaft 58 and is also fastened to a plate 64. This spring is biased to counterbalance, or partly counterbalance the weight of the coil 52. Plate 64 is substantially circular in shape and is rotatably carried by the rod 58 and abuts the lever arm 56. A screw 66 is threaded into the lever 56 and is disposed so that the screwhead overlaps the plate 64. Thus when the screw 66 is tightened, the plate 64 is clamped in place between the screwhead and the lever 56. It is apparent that by loosening the screw and rotating the plate 64, that the tension of the spring 62 can be changed with reference to the rod 58. Thus any desired tension may be acquired to counterbalance the weight of the secondary or to vary the current output therefrom, as will be explained hereinafter. The counterbalance is preferably adjusted so that secondary coil 52, when deenergized, will normally rest on the primary.

A bimetallic member 68 is also fixed to the shaft 58. The bimetallic member is of spiral form and one end thereof is held in a slot 70 in the rod 58. The other end of the spiral 68 is fastened to an adjustable pointer 72. The pointer 72 is associated with a radially shaped ear 74 that may be formed integrally with the end plate 26. The ear 74 is slotted arcuately at 76, which slot is disposed to receive a screw 78 that also passes through the pointer 72. A nut 80, disposed on the opposite side of the ear 74, is utilized to lock the screw and adjustable pointer 72 in any desired position against the ear 74. Thus the tension of the bimetallic spiral 68 may be varied within reasonable limits. The bimetallic spiral 68 is used as an ambient temperature compensator which will be explained in detail.

Referring to Fig. 8, a fragmentary view of the core 22 is shown in which a lever or arm 82 is pivoted at 84 on the lever 56. The arm 82 passes through an aperture 85 in the base 38. The aperture 85 is sufficiently large to eliminate any binding effect between the base 38 and the lever 82. The lever 82 is insulated from the mounting lever 56, or it may be fabricated from some suitable insulating material. The free end of the lever 82, after passing through the base 38, engages a spring mounting 86 of a movable contact 88. The spring 86 is mounted on a lug 90 secured to the base 38, which lug is used as a terminal connection. The spring mounting 88 is normally biased so that the movable contact 88 engages a fixed contact 92 which is also carried by the base 38. When the secondary coil 52 is not energized, as shown in Fig. 1, the lever 82 is extended and forces the movable contact 88 out of engagement with the fixed contact 92, to break the circuit therethrough. It will be noted that the counterbalance hereinbefore described, must be adjusted so that the weight of the secondary coil 52, acting through lever 82, will separate the contacts 88 and 92 when the secondary 52 is deenergized. When the secondary coil 52 is energized, the lever 82 is retracted, and the contacts 88 and 92 close due to the action of spring 86. It should be noted that when the transformer is in operating condition, that the secondary coil 52 moves the lever 82 out of contact with the switching mechanism, which relieves the lever 82 and the secondary coil 52 from any pressure due to contact through the lever, thus reducing friction and allowing the secondary coil to assume a substantially floating condition which affords accurate current compensation.

The screws 30, which are used to clamp the core between the two end plates, are of sufficient length to pass through the end plates 26 and 28 and engage a threaded mounting plate 44. The end plate 28 is spaced from the mounting plate 44 by tubular spacers 46 that are passed over the screws 30. The spacers 46 effectively space, not only the transformer 20 but also all the mechanism which is depended from the attached base plate 38.

The mounting plate 44 is likewise spaced from a similarly shaped plate 94 by screws 96 and associated tubular spacers 98. This arrangement maintains the plates at a definite position with respect to each other. The plates 44 and 94 are each provided with a flange around the edges thereof, to strengthen the plates and prevent buckling. The open space between the two plates 44 and 94 is provided to allow for the free passage of air between the plates. This effectively insulates the working mechanism of apparatus from the heat of combustion, when the control is mounted on a stack or otherwise associated with a furnace or the like.

A plate 102 is held between the plates 44 and 94 at the lower ends thereof by lugs 104, which are formed integrally with the plate 102. A screw 106, which passes through an elongated hole 108 in the plate 102, is threaded into the plate 94. The plate 102 may be termed a conduit plate as it is provided with two holes 110 and 112 which are of the proper size to receive BX connectors or other types of cable couplings. The plate 102 is easily removed from the mounting plate by loosening the screw 106 and sliding the plate 94 forwardly to disengage the lugs 104 from the mounting plate 44.

A tube 114 is attached to the upper end of the outer plate 44, as by clinching and extends inwardly from the plate 44 and through plate 94 to provide a support for the thermostat mechanism of a combustion control. Referring to Fig. 6, it will be noted that the plate 44 has been depressed to form a conical indentation or bearing as at 116. Ears or projections 115 formed integrally on the end of the tube 114 are passed through the plate 44 around the base of the bearing 116 and are clinched on the opposite side of the plate 44. The other end of the tube 114 carries an extension 118 which is spot welded, or otherwise suitably attached to the tube. The extension 118 forms a rigid support for one end of a helical thermostatic member 120 which is formed from a bimetallic strip. The thermostatic member 120 is connected to the extension 118 by a screw 122. The outer end of the helical member 120 is attached by a screw 124 to one end of a rod 126, which is flattened at 127 providing a suitable flat bearing surface for the bimetallic member 120. The other end of the rod 126 passes through the bearing 116 in plate 44. When the thermostatic metal 120 is heated, it expands and causes rotation of the attached rod 126, which movement is utilized to operate other mechanism included in the apparatus.

The inner or other end of the rod 126 is threaded to receive a nut 128 which secures a compression spring 130 and a lever 132 in place against a washer 134 which washer is fixedly attached to the rod 126. This spring coupled assembly of lever 132, spring 130 and washer 134 forms a friction clutch arrangement which, due to the friction between the lever 132 and washer 134, as caused by compression spring 130, causes the lever 132 to rotate with the rod 126 and washer 134 until the lever 132 reaches its definite limit of movement as determined by its associated mechanism. At this point, further rotation of the rod 126 causes slipping to occur between the lever 132 and washer 134 which slipping permits the rod 126 to rotate as much as required without placing either the lever 132 or bimetallic member 120 under any undesirable strain. The same operation is fulfilled in either direction of rotation of the rod 126.

An outwardly extending ear 131 is formed on lever 132, which ear 131 extends through an elongated hole 142 in lever 140. The lever 140 includes an outwardly pressed ear 144 which ear provides a connection for one end of a spring 146. The opposite end of spring 146 is connected to the ear 131 of the lever 132. The spring 146 maintains the levers 132 and 140 in close relation at all times. Thus the spring 146 provides a resilient connection between lever 140 and lever 132 that not only is without any end play but is also without the attendant friction that accompanies a "tight" bearing engagement. It should also be noted that lever 140 is constantly being drawn upwardly by this resilient connection during periods when the rod 126 is rotated due to heat on the bimetal 120. The lower end of lever 140 is hinged at 148 to an L shaped lever 150, which lever 150 is hinged by a pin 154 to an extension 156, that is fixedly mounted to the base plate 38. An enlarged view of the hinged connection between levers 140 and 150 is shown in Fig. 9.

Fig. 9 shows a radiator 160 in its displaced position as occasioned by the movement of the hinged assembly of levers 132, 140 and 150. The radiator 160 comprises a hollow central core portion 162 that carries a plurality of heat conducting fins 164. The assembly 160 is preferably made of brass, copper, aluminum or some other material that has desirable heat conducting characteristics. In the preferred form the upper closed end of the hollow core 162 is provided with a hardened steel bearing 166 to resist wear from contact with the pointed bearing end of a pin 168. The pointed upper end of pin 168 bears at the apex of the steel bearing 166 which assures that the radiator assembly 160 is only carried by a point, and therefore may be considered to be floating on the pin 168. It will be noted that angularity of the point of the pin 168 is much less than the angularity of the conical bearing 166, which allows free movement of the radiator 160. The lower end of the pin 168 is riveted to an insulating strip 170, which strip 170 is attached to the lever 150 as by rivets 172. The upper end of the core 162 of the radiator 160 terminates in a substantially flat surface 176 which surface provides a large conducting surface for contacting a like flat surface 178 on a housing 180 disposed around a heating coil 182. A ratchet 184, preferably fabricated from insulating material, with a brass sleeve bearing 186 pressed in place, is slipped over the housing 180 and the sleeve 186 is soldered to the housing 180. In this manner the ratchet 184 is not rotatable on the heater housing 180 except when the solder is melted.

When the radiator 160 is in contact with the housing surface 178, as shown in Fig. 5, the radiator 160 dissipates sufficient heat, generated in the heating coil 182, to prevent the fusing of the solder. When the radiator is in the position shown in Fig. 9, the radiator is not in such intimate conducting contact with the housing surface 178 and therefore dissipates less heat, if any, and, if the heating element 182 is energized for too long a period, the solder will be fused. Thus the action of the combustion control through the bimetallic member 120 and associated levers can displace the radiator 160 so that when the combustion chamber is hot, due to ignition of the fuel, the radiator 160 is in contact with the heater housing 180 to prevent the fusing of the solder and, when the combustion chamber is cold, the radiator 160 is out of contact with the housing 180 and the heater 182, if energized for too long a period, will fuse the solder. The floating bearing of radiator 160 on pin 168 provides for substantially perfect contact between the surfaces 176 and 178 to assure the maximum conductive effect between the two surfaces.

The insulated ratchet 184 provides a bearing point for one end of a spring contact member 190, which is mounted at its opposite end to a lug 192 that is clinched to the base 38. The spring member 190 carries a movable contact point 194. A second spring member 196 attached to another lug 198, which is clinched to the base 38, carries a contact 200. Both of the spring members 190 and 196 are biased to spring toward the front of the apparatus and to separate the contacts since the member 190 will spring out further than the member 196. When contacts 194 and 200 are in engagement, the free end of member 190 engages one of the teeth of the ratchet 184 to maintain the member 190 in a set or closed contact position. The engagement between member 190 and ratchet 184 will be maintained unless the soldered mounting of the ratchet 184 fuses, at which instant the ratchet will rotate counter-clockwise due to the conjoint tension of the spring contact members 190 and 196 on member 190, which in their normal biased position are always tending to rotate the ratchet 184 to allow the contacts to separate. As soon as the ratchet revolves the member 190 is disengaged and springs away from member 196 to separate the contacts 194 and 200. After the solder has re-hardened and ratchet 184 is again fixed in position on the heater housing 180, the members 190 and 196 may be reset so that contacts 194 and 200 again engage by merely pressing a reset pin 202 inwardly. The reset button or pin 202 is journalled in an elongated bearing 204 which bearing is spun over on the support or hinge member 152. The inner end of the reset pin 202 is of a smaller diameter as at 206 and passes through a slot 208 in the spring member 190, to assure alignment of the pin 202 with the member 190. The reset pin 202 has a circular lock spring 210 snapped into a groove in the pin which spring 210 forms an enlarged diameter to prevent the pin 202 from being displaced from its elongated bearing 204. Thus when the pin 202 is pressed to its maximum inward position, the contacts 194 and 200 on spring members 190 and 196 engage to complete a circuit.

An adjustable secondary air shutter 136 is provided and is disposed on the tube 114. The shutter or adjustment 136 is spring fitted on the tube and is placed on the tube 114 between plates 44 and 94 so that it is accessible for adjustment. The tube 114 is provided with an air opening 138 as shown in Fig. 7. Thus it is apparent that the shutter 136 may be rotated so as to vary the area of the hole 138 as desired. This allows any desired quantity of relatively cool air from the room to circulate through the helix 120, to cool the same, which provides for more rapid operation of the control after the burner has been extinguished.

Fig. 11 shows a schematic wiring diagram of the system. Power is supplied by lines 210 and 212, current passes from the wire 210, which is connected to contact 200, to contact 194, wire 214, to one side of the transformer primary coil 48. A branch of this circuit also goes through wire 216 to contact 92, contact 88, member 86, wire 220 to one side of the motor 222 which operates the blower. The other side of the line, namely wire 212, is connected directly to the motor 22. A branch of this circuit traverses wire 224 to the primary 48 to the transformer. Thus it will be noted that the primary 48 of the transformer is constantly energized. An ignition device 223 (shown in part) is connected in parallel with the motor 222 by wires 221 and 225. It will be noted that the ignition device 223 is energized simultaneously with the motor 222.

The secondary 52 of the transformer 20 is connected by wire 226 to a room thermostat 228 which is connected by wire 230 to one terminal of the heater 182. The other heater terminal is connected to the secondary 52 by wire 232. Therefore the secondary circuit is complete through the thermostat 228 and heater coil 182.

The operation of the device may be explained as follows: the primary 48 of the transformer 20 is constantly energized so that the entire system is operatively responsive to the opening or closing of the secondary circuit. Thus when the room thermostat 228, due to a demand for heat in the enclosure being heated, closes the secondary circuit, an induced current is caused to flow through the secondary winding 52, which causes the secondary 52 to be repulsed from the primary 48. This causes the secondary 52 to move about its axis 58. This movement causes the lever 82 which is associated with the secondary 52 to be drawn away from the contact member 86 of the motor switch, allowing contacts 88 and 92 to close, which energizes the motor 222 and ignition device 223. The motor 222 is connected to a fuel pump and blower (not shown), or the conventional equipment for supplying fuel to be burned. Closing the motor switch also energizes the ignition device 223, which ignites the fuel. Whenever the secondary circuit is closed, current is continuously traversing the heater coil 182 of the safety switch. This passage of current causes the heater 182 to radiate heat, that is absorbed by the heater housing 180. If the heat output of the heater is not modified within a predetermined period the soldered mounting of the ratchet 184 will become sufficiently heated to allow the ratchet to rotate to trip the safety switch and separate contacts 194 and 200. The breaking of the circuit through these contacts not only stops the motor but also deenergizes the primary 48 of the transformer 20. Thus if a fuel shortage, fuel failure due to plugged supply pipes, broken ignition system, or any other abnormal condition occurs, the system is quickly deenergized. When the fuel ignites properly and the operation is normal, the bimetal thermostat 120 of the combustion control causes its associated levers 132, 140 and 150 to associate the radiator, or heat dissipator 160 with the heater housing 180. The radiator 160 modifies the temperature of the heater housing 180 by conducting heat away from the housing 180 and radiating the heat thus obtained to the surrounding atmosphere. In this manner the heater 182 does not supply sufficient heat to fuse the solder when the radiator 160 is in contact with the heater housing 180. Thus the radiator 160 modifies the effect of the heater 182 whenever it is associated with the heater housing 180 to prevent the operation of the safety switch.

Another feature of my invention is the provision of current and ambient temperature compensators in the secondary coil 52 of the transformer 20. The transformer 20 is so designed as to produce a substantially constant current output at all times. Thus when the voltage of the power lines rises, the secondary 52 is repulsed so as to be further away from the primary 48. This maintains the induced voltage in the secondary and the current output therefrom constant. The secondary coil 52 is partly counter-balanced by a spring 62 so that it is substantially "floating," that is there is practically no energy expended in moving or rotating the secondary about its axis 58. This free movement allows for accurate, automatic coupling and aids in maintaining a constant current output. It is also possible to vary the current output from the transformer by adjusting this counter-balance.

The ambient temperature compensator hereinbefore described is utilized to modify the current output of the transformer so that the thermal safety switch will always operate or trip within a substantially constant time period. For example, when the ambient temperature is high it is apparent that the tripping device will operate in a shorter time period than when the ambient temperature is low, even though a constant current input is supplied to the heater. This is explained by the fact that the heat output of the heater 182 at any given current input will operate the tripping device within a certain time period at a set temperature. Lowering the ambient temperature necessarily lengthens this period while higher ambient temperatures correspondingly reduce the time period of operation. In the present embodiment, therefore, the ambient temperatures compensator is utilized to modify the current output of the transformer for maintaining the time period of operation of the safety switch substantially constant. For example, assuming that the heater requires a current input of .5 amp. at a 60 degree ambient temperature to fuse the solder in 90 seconds, it is evident that the same input will not allow for a similar time period of operation if the ambient temperature, is, say 90 degrees F. To compensate for such variations the bimetallic coil expands to raise the secondary and thus lower the current output so that only .45 amp. is being supplied to the heater 182, which will cause the solder to fuse within the set time period of 90 seconds. The foregoing is merely an example to illustrate the compensating characteristics of the transformer 20.

It is to be understood that the transformer with its compensating features and the modified tripping mechanism may be used advantageously in connection with one another but their use should not be limited to their combination as either may be used for a specific purpose and will operate in a very satisfactory manner.

In a like manner the thermal circuit breaker may be advantageously applied to other types of electric control systems that include a device that is sensitive to a function of the system for associating the dissipator with the circuit breaker.

While the form of embodiment of the present invention as herein disclosed constitutes a preferred form, it is to be understood that other forms might be adapted, all coming within the scope of the claims as follows:

I claim:

1. In combination with a transformer having two coils movable relative to one another when said coils are energized, a switching means, electrically operated thermal means for operating said switching means, said thermal means being connected in circuit with one of said coils; and thermal responsive means for controlling the relative movement of said coils for regulating the flow of current through said first mentioned thermal means.

2. A current transformer comprising in combination, a core; a primary winding associated with the core for inducing a magnetic flux in the core; a secondary winding associated with the core and subjected to the magnetic flux in the core for causing a voltage to be induced in the secondary winding, one of said windings being movable relative to the other and moved in response to changes in the current values in the primary winding; an electrical translating device energized by the current of the secondary winding; and temperature responsive means associated with said movable winding for affecting the movement of said one winding relative to the other.

3. A current transformer comprising in combination, a core; a primary winding associated with the core for inducing a magnetic flux in the core; a secondary winding associated with the core and subjected to the magnetic flux in the core for causing a voltage to be induced in the secondary winding, one of said windings being movable relative to the other and moved in response to changes in the current values in the primary winding; an electrical translating device energized by the current of the secondary winding; and temperature responsive means associated with said one winding for tending to increase or decrease the amount of movement of said one winding as the ambient temperature decreases and increases respectively.

4. A current transformer comprising in combination, a core; a stationary winding associated with the core for inducing a magnetic flux in the core; a movable winding associated with the core and subjected to the magnetic flux in the core for causing a voltage to be induced in the secondary winding, said movable winding being repulsed and moved by energization of the said stationary winding with a force in direct ratio to the voltage impressed across primary winding of the transformer; an electrical translating device energized by the secondary winding; means associated with the movable winding for yieldingly affecting the movement thereof; and a second means responsive to ambient temperature conditions for yieldingly affecting the movement of said movable winding for increasing and decreasing the current output of the transformer substantially as the ambient temperature decreases and increases respectively.

5. In a switching device, a switch; electrically heated thermal means for operating said switch; and means for energizing the said thermal means including a second thermal means responsive to ambient temperature for increasing and decreasing the current in-put to said first thermal means in response to a decrease and increase respectively of the ambient temperature whereby the first said thermal means operates the switching device within a substantially constant period regardless of the variation in the ambient temperature.

ESTEL C. RANEY.